March 15, 1960 D. J. GREEN 2,929,057

FREQUENCY MODULATION ALTIMETER

Filed Jan. 31, 1957 2 Sheets-Sheet 1

INVENTOR.
DAVID J. GREEN,
BY Perry E. Turner
AGENT.

INVENTOR.
DAVID J. GREEN,
BY
Perry E. Turner
AGENT.

United States Patent Office 2,929,057
Patented Mar. 15, 1960

2,929,057

FREQUENCY MODULATION ALTIMETER

David J. Green, Beverly Hills, Calif., assignor to Lear, Incorporated

Application January 31, 1957, Serial No. 637,508

2 Claims. (Cl. 343—14)

Figure 1:
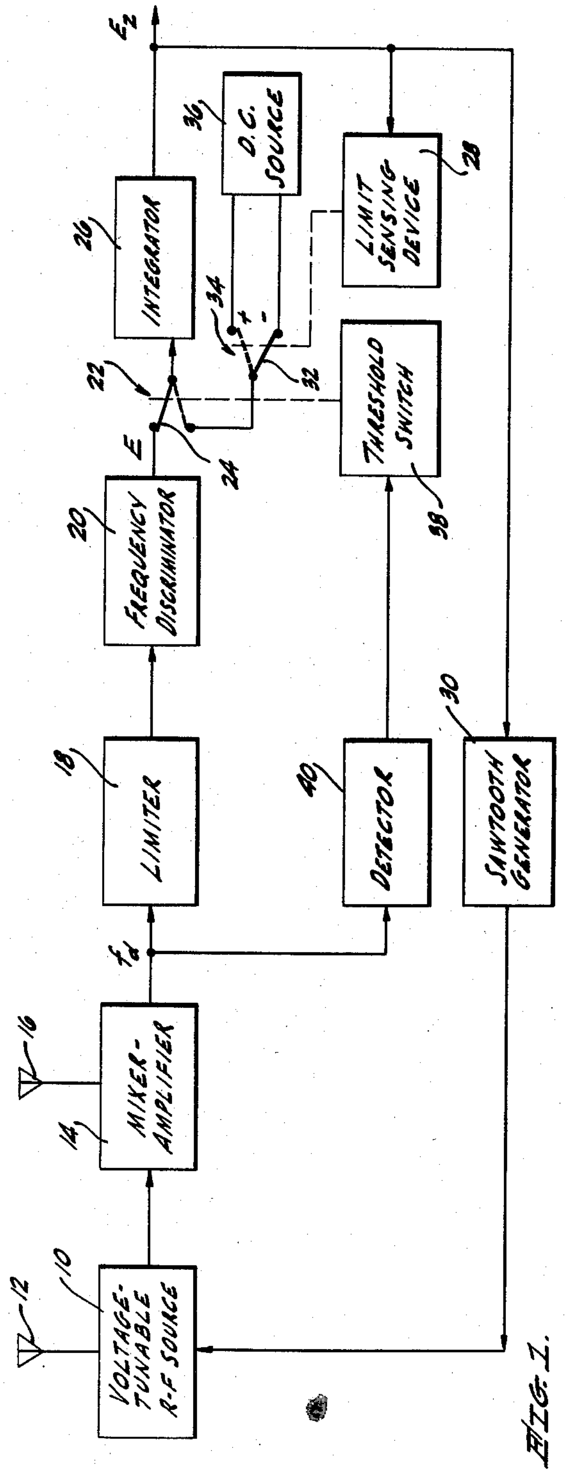

This invention relates to distance measuring devices, and more particularly to frequency modulation altimeters of the closed loop type.

More particularly, this invention relates to closed loop frequency modulation altimeters of the type wherein the rate of frequency change of the transmitted signal is controlled so as to hold the beat frequency of the transmitted and reflected signals substantially constant. Such systems as heretofore known are characterized by complex and costly equipment, and suffer the disadvantage that false readings are provided in the event of failure of certain portions of the system.

It is an object of this invention to provide an improved frequency modulation altimeter of the closed loop type, wherein the likelihood of false altitude indications is substantially eliminated.

It is a further object of this invention to provide an improved closed-loop type of frequency modulation altimeter comprising a minimum number of component parts of simple design, which is smaller and lighter than similar systems of the prior art.

The above and other objects and advantages of this invention will be apparent from the following description, taken in conjunction with the accompanying drawings, in which a preferred embodiment of the invention is illustrated by way of example. The scope of the invention is pointed out in the appended claims.

Figure 2:
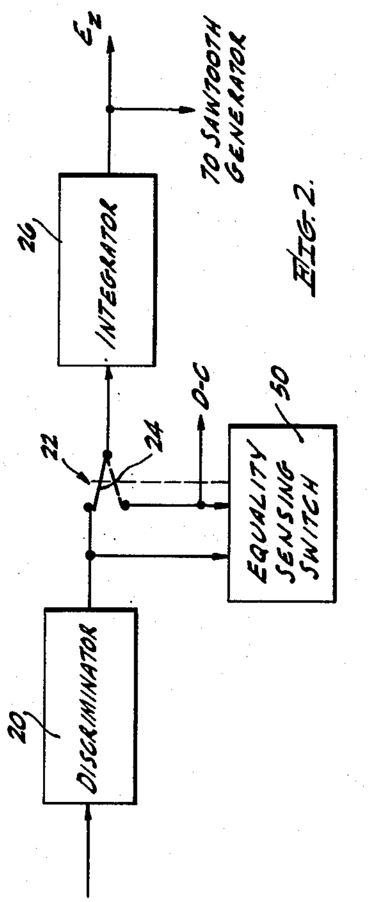
Figures 3, 4:
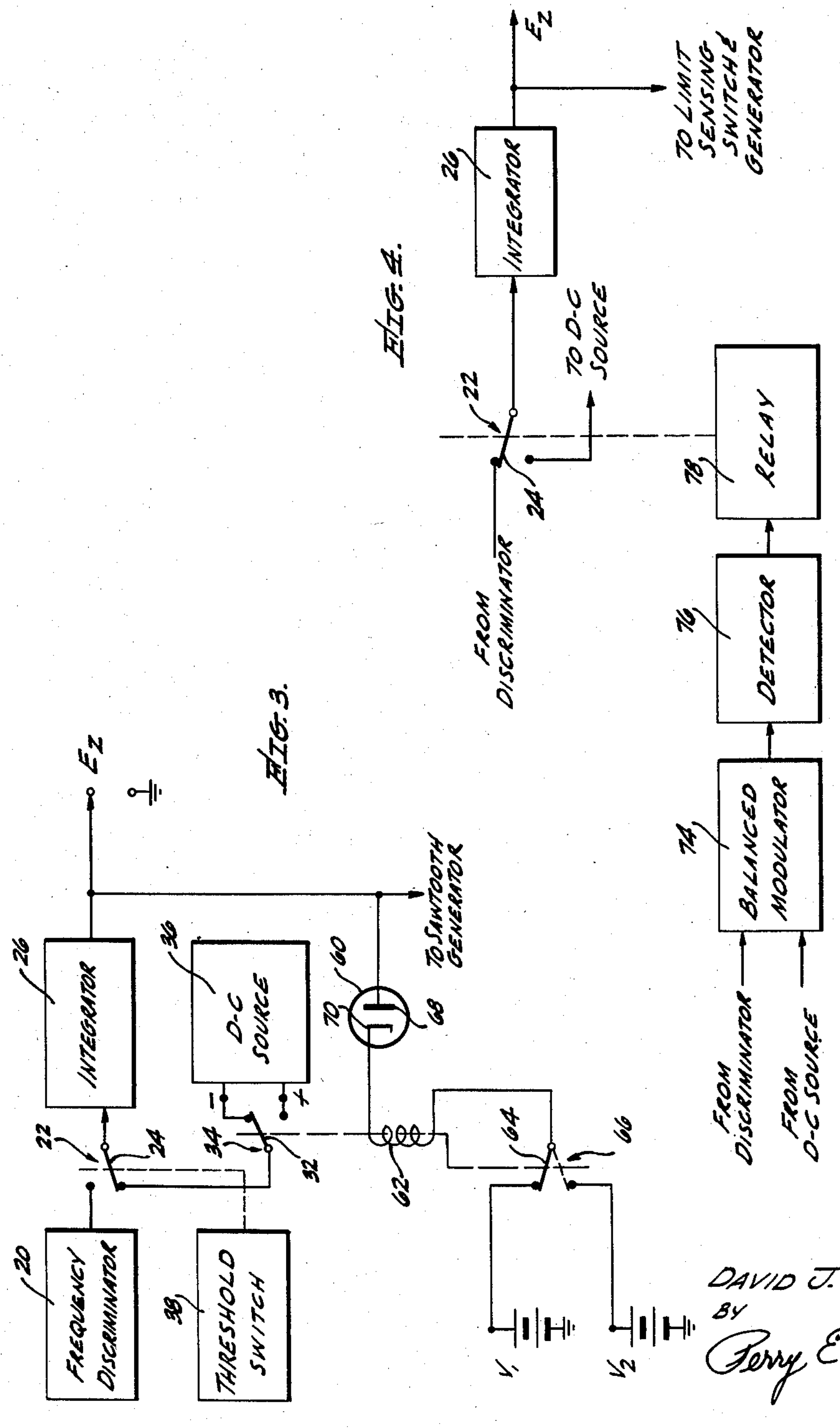

In the drawing,

Fig. 1 is a block diagram of an improved frequency modulation altimeter in accordance with the invention, Fig. 2 is a block diagram of a modification of a portion of the altimeter of Fig. 1, Fig. 3 is a schematic diagram illustrating a circuit suitable for a portion of the altimeter of Fig. 1, and Fig. 4 is a block diagram of a network suitable for use in the arrangement of Fig. 2.

Briefly, in a frequency modulation altimeter in accordance with this invention, the beat frequency signal of the transmitted and reflected signals is applied to a frequency discriminator. The output of the discriminator is integrated to provide a voltage representing the current or instantaneous altitude. This integrated signal is also utilized to modulate the transmitter, whereby the rate of frequency change of the transmitted signal is controlled to maintain the beat frequency substantially constant.

Referring to Fig. 1, the altimeter of this invention comprises a voltage-tunable R.-F. source 10 for transmitting signals from an antenna 12, and receiver means as represented by a mixer-amplifier network 14. The source 10 is coupled to the mixer-amplifier 14, whereby the reflected signal applied thereto from a receiving antenna 16 is mixed with the locally generated signal to develop the beat or difference frequency signal, $f_d$. A limiter and frequency discriminator combination 18, 20 is provided which limits the amplitude of the beat frequency signal and develops a corresponding D.-C. voltage, E, all in a conventional manner.

A switching device, indicated as a single-pole double-throw switch or relay 22, is connected between discriminator 20 and an integrator 26, with the relay armature 24 connected to integrator 26. Integrator 26 preferably is of the inverse-sign type, e.g., a Miller integrator. The output of integrator 26 is coupled to a limit sensing device 28 and a sawtooth generator 30. Limit sensing device 28 is adapted to actuate the arm 32 of a further switching device or relay 34 between the terminals of a D.-C. voltage source 36, in a manner hereinafter to be explained.

The armature 24 of relay 22 is adapted, also in a manner hereinafter to be explained, to be actuated by a threshold switch circuit 38, to which the detector 40 of the receiver means is coupled. The arm 32 of switch 34 is directly connected to one terminal of relay 22, as illustrated.

Source 10 preferably is a voltage-tunable device, such as a backward-wave oscillator, traveling-wave tube or klystron, having an inherently stable transfer characteristic as represented by the intrinsic relationship between incremental frequency and incremental voltage. A suitable example is the backward-wave oscillator which utilizes a long electron drift space between the source cathode and the ultimate anode; located in this space is a periodic structure capable of propagating microwave energy, and the electron stream in passing through this structure as it traverses between the cathode and anode generates a microwave signal having a frequency proportional to the dimensions of the structure and the electron drift velocity. Since the velocity of the electron stream is controlled by the voltage impressed between the anode and cathode, the generated frequency is similarly controlled by this voltage. This represents an inherent property of generators of this class, and is substantially independent of ambient temperature and other environmental conditions. If source 10 is modulated by a sawtooth voltage wave form, a sawtooth frequency excursion results. For the purpose of this invention, sawtooth generator 30 controls this frequency excursion between predetermined limits; for this purpose, conventional means may be employed for developing a fixed amplitude sawtooth voltage, the slope or repetition rate of which changes and corresponds to the input of the generator.

In the receiver, the amplifier preferably is sharply tuned and has a narrow bandwith centered about the center frequency of discriminator 20. Further, the pass band of the amplifier represents only a small fraction of the frequency excursions of the radiated signal.

It will be apparent that the output voltage, $E_z$, corresponds to the altitude or distance between the source 10 and a stationary target from which the radiated wave is reflected. At a given or fixed altitude, the slope of the sawtooth voltage wave form, and hence the rate of change of frequency of the radiated wave, is such that the beat frequency is substantially the same as the center frequency of the discriminator, $f_o$, and the output of the discriminator E, is zero.

If the distance to the target is now decreased, the beat frequency tends to decrease, whereupon a negative D.-C. voltage appears in the output of discriminator 20 and effects an increase in the output of integrator 26. Sawtooth generator 30 responds to the increased integrator output to increase the slope of the sawtooth voltage wave form, and accordingly to increase the rate of frequency change of the radiated signal between the predetermined limits. This results in an increase in the beat frequency to return it to the predetermined value.

To further aid in understanding the operation of the frequency modulation altimeter of this invention, it is noted that since an integrator is used to establish the voltage indicative of altitude, this measured value can be constant only if the output of the discriminator 20 goes to zero immediately following any change in the beat frequency. Therefore, in any fixed altitude situation, it is necessary that the beat frequency be substantially equal to the center frequency of the discriminator. The value of the beat frequency is given by $$f_d = \dot{f}t = \frac{2z\dot{f}}{c}$$

where $\dot{f}$ is the rate-of-change of the radio frequency signal $(df/dt)$;
$t$ is the elapsed travel time of the signal;
$z$ is the altitude or distance;
$c$ is the velocity of propagation of radio waves.

It will be observed from the above relationship that if $f_d$ be a constant, $z\dot{f}$ must also have a constant value, and $\dot{f}$ must vary reciprocally with $z$. Under these conditions, the output of discriminator 20 may return to zero following any change therein without affecting the value of the output voltage, $E_z$, developed by integrator 26 in response to the change.

Since only a narrow range of beat frequencies about $f_o$ is of concern in the system of this invention, the advantage of a narrow bandwidth amplifier can be readily appreciated; spurious frequencies resulting from mechanical vibration of circuit elements are greatly minimized. Further, the center frequency, $f_o$, of discriminator 20 can be chosen at a point where minimum spurious microphonic signal interference exists. Additionally, if the center frequency $f_o$ bisects the pass band of the amplifier, then random spurious signals will be equally distributed in the positive and negative output regions of the discriminator and will statistically tend to integrate toward zero effect upon the output signal, $E_z$.

The arrangement of switches 22, 34, limit-sensing and threshold switches 28, 38, D.-C. source 36 and detector 40 comprise means for initially determining altitude when the altimeter system is activated. Threshold switch 38 controls the switch 22 in accordance with the magnitude of the output of detector 40, and for this purpose may comprise simple relay means operable in the de-energized condition to connect integrator 26 to discriminator 20, and in the energized condition to connect integrator 26 to D.-C. source 36. Preferably, threshold switch 38 connects switch arm 24 to D.-C. source 36 so long as the output of detector 40 is below a predetermined level, and to the output of the frequency discriminator 20 for detector outputs above that level.

Limit sensing switch 28 responds to the output of integrator 26 to move switch arm 32 between the terminals of D.-C. source 36. For this purpose, limit sensing switch 28 preferably comprises diode and relay switching means operable at different voltages to actuate switch arm 32; at a predetermined minimum integrator output corresponding to minimum or zero altitude, switch arm 32 is connected to the negative terminal of source 26, and at a predetermined maximum integrator output corresponding to the maximum permissible altitude reading for the system, switch arm 32 is connected to the positive terminal of source 26.

One arrangement for limit sensing switch 28 is shown in Fig. 3. Referring to Fig. 3, a unidirectionally conductive device, shown as a diode 60, is connected between integrator 26 and one end of a relay control coil 62. The other end of coil 62 is connected to the switch arm 64 of a single-pole double-throw switch 66, for switching between two points of D.-C. potential $V_1$ and $V_2$. Coil 62 is adapted to actuate switch arm 64 when energized; in the de-energized condition of coil 62, switch arm 64 is normally in contact with the point of higher potential, $V_1$. Further, switch arm 32 is in contact with the negative terminal of D.-C. source 36 in the de-energized condition of coil 62. As illustrated, the anode 68 of diode 60 is connected to integrator 26, and the cathode 70 is connected to the one end of coil 62.

While the integrator output voltage, $E_z$, is negative with respect to potential $V_1$, the diode is non-conductive. When the output voltage $E_z$ reaches the potential $V_1$, diode 60 conducts. Current flow through coil 62 causes the switch arm 64 to be connected to the point of lower D.-C. potential, $V_2$, and the switch arm 32 to be moved to the positive terminal of D.-C. source 36. When this occurs, the integrator output decreases until it reaches the potential $V_2$, whereupon diode 60 ceases conduction, switch arm 64 is connected to potential $V_1$, and switch arm 32 is returned to the positive terminal of D.-C. source 36. Potentials $V_1$ and $V_2$ are chosen to permit the output of integrator 26 to range through all desired altitude values.

It will be apparent that the circuit of Fig. 3 represents merely one arrangement to effect switching of integrator 26 between points of different potential, and that any switching means for this purpose is embraced by this invention.

The action of integrator 26 in integrating the D.-C. voltage is to cause the output voltage $E_z$ to sweep at a constant rate. When the preselected maximum or minimum value is reached and limit sensing switch 38 is actuated, the polarity of the D.-C. voltage applied to integrator 26 is reversed, thus causing the output voltage of $E_z$ to sweep in the opposite direction. In this manner, the output voltage $E_z$ is caused to sweep, or scan, in a recurrent fashion through all altitude values.

While thus scanning through all the possible altitude values, detector 40 monitors the beat frequency signal to detect the presence of a signal to be applied to the integrator, i.e., a beat frequency signal $f_d$ substantially equal to the discriminator center frequency $f_o$. When the desired beat frequency signal is approached, the output voltage of detector 40 reaches a level sufficient to cause threshold switch 38 to connect switch arm 24 to the output of discriminator 20. Thereafter, the system operates as previously described. If loss of signal occurs, threshold switch 38 automatically connects switch arm 24 to D.-C. source 36, whereupon scanning takes place to effect lock-on when signals are again present.

Fig. 2 illustrates an alternative operation to effect initial lock-on of the system. Referring to Fig. 2, the output of discriminator 20 and the D.-C. source (through switch 34) are connected to an equality sensing switch 50 which continuously compares the magnitude of the discriminator output with the D.-C. potential. This switch holds switch arm 24 in contact with the D.-C. source until the discriminator output reaches the potential of the terminal of the D.-C. source to which switch arm 32 is connected; at this point, switch arm 24 is connected to the output of discriminator 20. This lock-on control circuit does not have the feature of automatically connecting switch arm 24 to the D.-C. source upon loss of signal; however, a detector may be employed in conjunction with this circuit to monitor the beat frequency signal and thereby provide automatic scanning under such conditions, as in the manner shown in Fig. 1.

Fig. 4 illustrates one network for the equality sensing switch 50. As shown, this arrangement comprises a balanced modulator 74, a detector 76 and a relay 78, all conventional in the art. The D.-C. voltages from discriminator 20 and D.-C. source 36 are applied to the modulator, and detector 76 responds to the resultant output to control relay 78 and switch 22 in the manner previously described. Other arrangements to accomplish this function will be apparent.

It will be apparent from the foregoing that a simple but highly efficient frequency modulation altimeter has been described. False distance indications are highly unlikely, inasmuch as failure or inoperativeness of circuitry within the loop will either result in failure to develop an output signal or in automatic scanning to continuously vary the output signal and thereby indicate that output voltage readings are not representative of true distance measurement.

What is claimed is:

1. A distance determining system utilizing reflected radio waves comprising a radio transmitter for transmitting a radio wave, means to develop a sawtooth voltage for frequency modulating said transmitter, means for receiving said wave after reflection from an object, means to combine the transmitted and reflected waves to produce a beat frequency signal, a frequency discriminator having a center frequency of a predetermined constant value through which the beat frequency signal is passed, means for integrating the output of said discriminator to obtain a control signal, means to apply said control signal to said frequency modulating means for controlling the frequency of the sawtooth voltage so as to hold said beat frequency signal substantially to said predetermined constant value, a D.-C. source having positive and negative terminals, a first switch, limit sensing means connected to said integrating means and operable at predetermined control signals to actuate and move said switch from one to the other of said terminals, a detector, means for applying said beat frequency signal to said detector, a second switch connected to said integrating means and adapted in respective first and second positions to connect said integrating means to said D.-C. source and to said discriminator, means coupled to said detector and operable to place said second switch in said first position when the beat frequency signal is substantially different from said predetermined constant value and in said second position when the beat frequency signal is substantially at said predetermined constant value.

2. A distance determining system utilizing reflected radio waves comprising a radio transmitter for transmitting a radio wave, means to develop a sawtooth voltage for frequency modulating said transmitter, means for receiving said wave after reflection from an object, means to combine the transmitted and reflected waves to produce a beat frequency signal, a frequency discriminator having a center frequency of a predetermined constant value through which the beat frequency signal is passed, means for integrating the output of said discriminator to obtain a control signal, means to apply said control signal to said frequency modulating means for controlling the frequency of the sawtooth voltage so as to hold said beat frequency signal substantially to said predetermined constant value, a D.-C. source having positive and negative terminals, a first switch, means connected to said integrating means and operable at respective predetermined control signals corresponding to maximum and minimum distances to be measured to actuate and move said switch from one to the other of said terminals, a second switch connected to said integrating means and adapted in respective first and second positions to connect said integrating means to said D.-C. source and to said discriminator, means to compare voltages from said discriminator and said D.-C. source when the system is initially activated, said voltage comparing means holding said second switch in said first position initially, and said voltage comparing means moving said switch to said second position when the voltages from said discriminator and said D.-C. source are substantially equal.

References Cited in the file of this patent

UNITED STATES PATENTS

| | | |
|---|---|---|
| 2,537,593 | Landon et al. | Jan. 9, 1951 |
| 2,726,383 | Dunn | Dec. 6, 1955 |
| 2,748,272 | Schrock | May 29, 1956 |